United States Patent
Schlueter, Jr. et al.

(10) Patent No.: US 6,647,237 B2
(45) Date of Patent: Nov. 11, 2003

(54) THREE LAYER SEAMLESS TRANSFER COMPONENT

(75) Inventors: Edward L. Schlueter, Jr., Rochester, NY (US); Gerald M. Fletcher, Pittsford, NY (US); Nancy Y. Jia, Webster, NY (US); John S. Berkes, Webster, NY (US)

(73) Assignee: Xerox Corporation, Stamford, CT (US)

( * ) Notice: Subject to any disclaimer, the term of this patent is extended or adjusted under 35 U.S.C. 154(b) by 201 days.

(21) Appl. No.: 09/726,674

(22) Filed: Nov. 29, 2000

(65) Prior Publication Data

US 2002/0064648 A1 May 30, 2002

(51) Int. Cl.[7] .................. G03G 15/16; G03G 15/20; B32B 25/08; B32B 25/20; B32B 27/30

(52) U.S. Cl. .................. 399/307; 399/308; 428/332; 428/422; 428/447; 428/448; 428/457; 430/126; 442/289; 442/293; 442/393; 442/397

(58) Field of Search .................. 442/289, 293, 442/397, 393; 497/56; 428/35.8, 36.8, 36.1, 36.91, 332, 334, 335, 336, 421, 422, 447, 448, 906, 457; 430/126; 399/297, 307, 308, 299

(56) References Cited

U.S. PATENT DOCUMENTS

| | | | | |
|---|---|---|---|---|
| 5,150,165 A | * | 9/1992 | Asai | 355/274 |
| 5,753,307 A | * | 5/1998 | Badesha et al. | 427/387 |
| 5,849,399 A | * | 12/1998 | Law et al. | 428/212 |
| 5,991,590 A | * | 11/1999 | Chang et al. | 399/302 |
| 6,072,156 A | * | 6/2000 | Matsuo et al. | 219/216 |
| 6,088,565 A | | 7/2000 | Jia et al. | 399/302 |
| 6,101,360 A | * | 8/2000 | Hara et al. | 399/308 |

* cited by examiner

*Primary Examiner*—Ramsey Zacharia
(74) *Attorney, Agent, or Firm*—Annette L. Bade

(57) ABSTRACT

A three-layer transfer member having a rigid substrate, a conformable intermediate layer and an outer thin fluoropolymer layer wherein the fluoropolymer layer can be tetrafluoroethylene, perfluoroalkoxy, fluorine ethylene propene monomers, polymers thereof, and mixtures thereof, and an image apparatus including the same.

20 Claims, 2 Drawing Sheets

THREE LAYER SEAMLESS TRANSFER COMPONENT

BACKGROUND OF THE INVENTION

The present invention relates generally to transfer members useful in imaging components, for use in electrostatographic, including digital, apparatuses. The transfer layers herein are useful for many purposes including layers for transfer films such as intermediate transfer, transfix or transfuse films, and the like. More specifically, the present invention relates to a transfer component having a three-layer configuration. In particularly preferred embodiments, the transfer component has a) an electrically controlled stiff or rigid substrate, b) an electrically controlled conformable intermediate layer, and c) a thin, low friction outer layer. In a another preferred embodiment, the outer layer is a thin fluoropolymer layer. The three-layer transfer component of the present invention may be useful in films used in xerographic machines, especially color machines.

In a typical electrostatographic reproducing apparatus such as an electrophotographic imaging system using a photoreceptor, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration. Another type of developer uses "dry" or powder toner particles with developer beads as the carrier for the toner particles.

The developed toner image recorded on the imaging member can be transferred to an image receiving substrate such as paper via an intermediate transfer member. Alternatively, the developed image can be transferred to an intermediate transfer member from the image receiving member via another transfer member. The toner particles may be transferred by heat and/or pressure to an intermediate transfer member, or more commonly, the toner image particles may be electrostatically transferred to the intermediate transfer member by means of an electrical potential between the imaging member and the intermediate transfer member. After the toner has been transferred to the intermediate transfer member, it can then be transferred to the image receiving substrate, for example by contacting the substrate with the toner image on the intermediate transfer member under heat and/or pressure. Alternatively, the developed image can be transferred to another intermediate transfer member such as a transfix/transfuse or transfer member. A transfix or transfuse member uses heat associated with the transfer member in order to both transfer and fix or fuse the developed image to a copy substrate.

Intermediate transfer members, including transfix or transfuse members, enable high throughput at modest process speeds. In four-color photocopier systems, the transfer member also improves registration of the final color toner image. In such systems, the four component colors of cyan, yellow, magenta and black may be synchronously developed onto one or more imaging members and transferred in registration onto a transfer member at a transfer station. Additional colors may be used, thereby requiring more than four color stations.

In electrostatographic printing machines it is desired that the transfer of the toner particles from the transfer member to any subsequent intermediate transfer members or, alternatively, to the final image receiving substrate be very high, preferably substantially 100 percent. Less than complete transfer to the image receiving substrate results in image degradation and low resolution. Highly efficient transfer is particularly important when the imaging process involves generating full color images since undesirable color deterioration in the final colors can occur when the color images are not efficiently transferred from the transfer member.

Thus, it is desired that the transfer member surface have excellent release characteristics with respect to the toner particles. Conventional materials known in the art for use as transfer member layers often possess the strength, conformability and electrical conductivity necessary for use as transfer members, but can suffer from poor toner release characteristics. When heat is associated with a transfer member, such as in the case of a transfix member, the transfix member should also ideally possess good thermal conductivity in addition to superior release characteristics.

In addition, it is desired that the transfer member have sufficient toughness to undergo multiple cycling during use. Moreover, the outer layer of the transfer member should be chemically compatible with the toner to be used, and with paper with which the layer will come in contact. In known electrophotostatographic machines, diketones are normally used in paper and toner components. Therefore, it is desired that the transfer outer layer be compatible with diketones and other components of toner and paper.

U.S. Pat. No. 6,118,968 discloses an intermediate transfer member comprising a plastic or polyimide substrate, an intermediate adhesive such as a polyurethane solventless adhesive, and an outer polyphenylene sulfide layer.

U.S. Pat. No. 5,998,010 discloses a transfer member comprising a plastic substrate having an adhesive intermediate layer of epoxy resins or polysiloxanes, and an outer release layer of a polymer having more than one type of carbon black dispersed therein. The polymer of the outer layer can be a polyimide, a urethane or a silicone.

U.S. Pat. No. 5,761,595 discloses a three-layer intermediate transfer member having a plastic substrate, a fluorinated carbon filled fluoroelastomer intermediate layer, and an outer silicone release layer.

U.S. Pat. No. 5,361,126 discloses an imaging apparatus including a transfer member including a heater and pressure-applying roller, wherein the transfer member includes a fabric substrate and an impurity-absorbent material as a top layer. The impurity-absorbing material can include a rubber material.

U.S. Pat. No. 5,337,129 discloses an intermediate transfer component comprising a substrate and a ceramer or grafted ceramer coating comprised of integral, interpenetrating networks of haloelastomer, silicon oxide, and optionally polyorganosiloxane.

U.S. Pat. No. 5,340,679 discloses an intermediate transfer component comprised of a substrate and thereover a coating comprised of a volume grafted elastomer, which is a substantially uniform integral interpenetrating network of a hybrid composition of a fluoroelastomer and a polyorganosiloxane.

U.S. Pat. No. 5,456,987 discloses an intermediate transfer component comprising a substrate and a titamer or grafted titamer coating comprised of integral, interpenetrating networks of haloelastomer, titanium dioxide, and optionally polyorganosiloxane.

In tandem color systems, multiple images are transferred from a photoconductive surface to an intermediate transfer member. In some systems, the images are subsequently transferred from the intermediate transfer member to a transfix or transfuse member. The transfix or transfuse member transfers the developed images to a copy substrate and fuses the image thereto, thereby forming a permanent image on the copy substrate. Because of these multiple cycles, it is desired that there be low friction between the transfer member and the photoconductive member. Although it can be made to be very small, it is desired that some amount of differential velocity between the transfer member and the photoreceptor typically be accommodated in electrostatographic systems, due to drives and mechanical tolerances. This low friction allows some amount of differential velocity between the photoreceptor and the transfer member without substantially impacting image quality. It is further desired that the transfer member, for example, a transfer belt, not elastically stretch during multiple cycling. Therefore, in color registration, a sufficiently laterally rigid substrate is desired for the transfer member. However, single layer rigid transfer belts lead to a very high local pressure acting on high pile height toner images during, for example, transfer to the intermediate transfer member. For certain high toner and photoconductor adhesion conditions, this can lead to what is referred to as a "hollow character" transfer defect.

For transfer members, a conformable rubber overcoating such as a silicone on top of a rigid substrate can relieve the hollow character problem during transfer to the intermediate layer. However, experiments have shown that such rubber coatings have a tendency to create high transfer of background particles off the imaging substrate. Such rubber coatings can significantly reduce the ability to achieve high transfer efficiency off of the intermediate at a low or a moderate temperature, and they create high friction between the intermediate belt and the imaging drums.

Therefore, it is desired to provide a transfer member that has high transfer off the intermediate transfer member without increasing background transfer. It is further desired to provide a transfer member that has low friction, which is desired to allow some amount of slip in the transfer zones. Another desired quality of a transfer member is allow for minimizing the magnitude of the local pressure acting on high pile height lines, thereby preventing hollow character defect. A further desired quality for transfer member, is obtaining a high degree of conformance in the transfer zones in order to reduce air gaps between the toner images on the photoreceptor and the transfer member, thereby reducing air breakdown issues and enhancing transfer. A further desired quality of a transfer member is to allow for printing on rough surfaces such as cardboard boxes, paper towels, and like rough surfaces.

SUMMARY OF THE INVENTION

The present invention provides, in embodiments: a transfer member comprising, a) a rigid substrate, b) a conformable intermediate layer positioned on the rigid substrate, and c) a thin fluoropolymer layer positioned on the conformable intermediate layer, wherein the fluoropolymer is selected from the group consisting of tetrafluoroethylene, perfluoroalkoxy, fluorine ethylene propene, polymers thereof, and mixtures thereof.

The present invention further provides, in embodiments: a transfer member comprising, a) a rigid substrate, b) a conformable intermediate layer positioned on the rigid substrate, c) a thin fluoropolymer layer positioned on the conformable intermediate layer, wherein the fluoropolymer is selected from the group consisting of tetrafluoroethylene, perfluoroalkoxy, fluorine ethylene propene, polymers thereof, and mixtures thereof, and d) a heating member associated with the rigid substrate.

In addition, the present invention provides, in embodiments: an image forming apparatus for forming images on a recording medium comprising, a) a charge-retentive surface to receive an electrostatic latent image thereon; b) a development component to apply a developer material to the charge-retentive surface to develop the electrostatic latent image to form a developed image on the charge-retentive surface; c) a first transfer member for transferring the developed image from the charge-retentive surface to a second transfer member or to a copy substrate, the first transfer member comprising, i) a rigid substrate, ii) a conformable intermediate layer positioned on the rigid substrate, and iii) a thin fluoropolymer layer positioned on the conformable intermediate layer, wherein the fluoropolymer is selected from the group consisting of tetrafluoroethylene, perfluoroalkoxy, fluorine ethylene propene, polymers thereof, and mixtures thereof.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

The present invention is directed to transfer members having a rigid substrate, a conformable intermediate layer, and a thin outer layer. The transfer members can be films, sheets, belts and the like, useful in electrostatographic, including digital, apparatuses. In one embodiment of the present invention, the transfer member can be useful as an intermediate transfer or as a transfix member in an electrostatographic apparatus. The disclosure is not intended to limit the number and types of uses for the component film disclosed herein.

Figure 1:
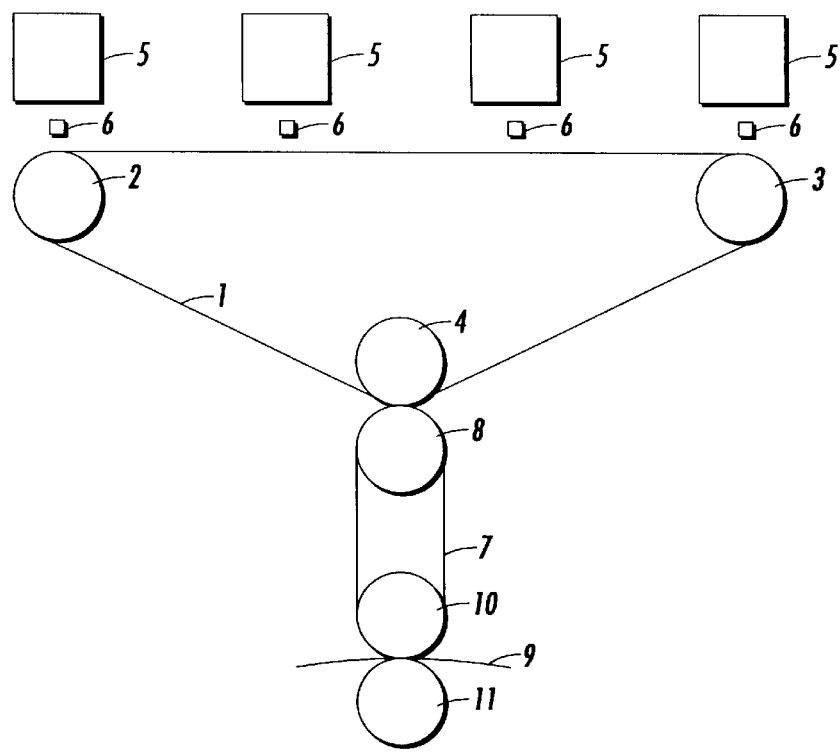
FIG. 1 is an illustration of a general electrostatographic apparatus using an intermediate transfer and transfix member.

Referring to FIG. 1, there is depicted an image-forming apparatus comprising intermediate transfer member 1 advanced by rollers 2, 3 and 4. Intermediate transfer member 1 is depicted as a belt or film member, but may be of another useful form such as a belt, sheet, film, drum, roller or the like. An image is processed and developed by image processing units 5. There may be as few as 1 processing unit, for example, for 1 color processing such as black, and as many processing units as desired. In embodiments, each processing unit processes a specific color. In preferred embodiments, there are 4 processing units for processing cyan, black, yellow and magenta. The first processing unit processes one color and transfers this developed one-color image to the intermediate transfer member 1 via transfer member 6. The intermediate transfer member 1 is advanced to the next relevant processing unit 5 and the process is repeated until a fully developed image is present on the intermediate transfer member 1.

After the necessary number of images are developed by image processing members 5 and transferred to intermediate transfer member 1 via transfer members 6, the fully developed image is transferred to transfix member 7. The transfer of the developed image to transfix member 7 is assisted by rollers 4 and 8, either or both of which may be a pressure roller or a roller having heat associated therewith. In a preferred embodiment, one of roller 4 or roller 8 is a pressure member, wherein the other roller 4 or 8 is a heated roller. Heat may be applied internal or external to the roller. Heat may be supplied by any known heat source.

In a preferred embodiment, the fully developed image is subsequently transferred to a copy substrate 9 from transfix member 7. Copy substrate 9, such as paper, is passed between rollers 10 and 11, wherein the developed image is transferred and fused to the copy substrate by transfix member 7 via rollers 10 and 11. Rollers 10 and/or 11 may or may not contain heat associated therewith. In a preferred embodiment, one of rollers 10 and 11 contains heat associated therewith in order to transfer and fuse the developed image to the copy substrate. Any form of known heat source may be associated with roller 10 and/or 11.

Figure 2:
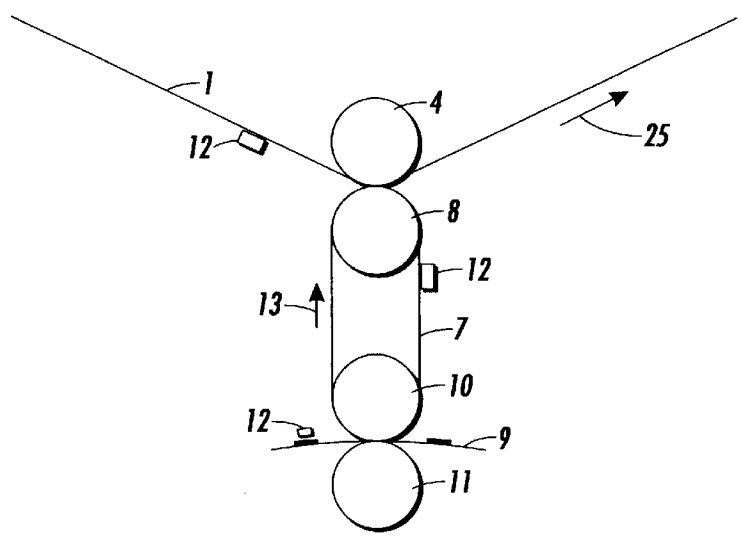
FIG. 2 is an illustration of an embodiment of a transfix system.

FIG. 2 demonstrates an enlarged view of an alternative embodiment of the invention and includes a transfix member 7 which may be in the form of a belt, sheet, film, roller, or like form. Intermediate transfer member 1 moves in the direction of arrow 25. The developed image 12 positioned on intermediate transfer member 1, is brought into contact with and transferred to transfix member 7 via rollers 4 and 8. As set forth above, roller 4 and/or roller 8 may or may not have heat associated therewith. Transfix member 7 proceeds in the direction of arrow 13. The developed image 12 is transferred and fused to a copy substrate 9 as copy substrate 9 is advanced between rollers 10 and 11. Rollers 10 and/or 11 may or may not have heat associated therewith.

Figure 3:
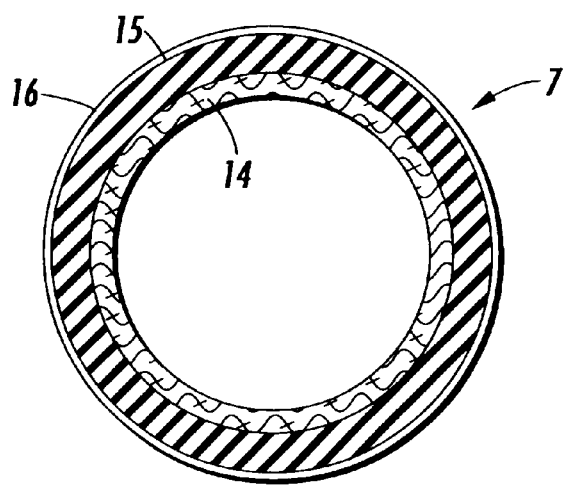
FIG. 3 is an enlarged view of an embodiment of a transfer member configuration involving a substrate, a conformable intermediate layer, and thin outer layer.

FIG. 3 demonstrates a preferred embodiment of the invention; wherein transfer member 1 comprises substrate 14, having thereover conformable intermediate layer 15. A thin outer layer 16 is positioned on the conformable intermediate layer 15. Substrate 14, in preferred embodiments, comprises plastic, metal or fabric. In a preferred embodiment, the substrate comprises a fabric or metal material, the intermediate conformable layer 15 comprises a silicone rubber or fluoropolymer, and the outer layer 16 is a thin fluoropolymer overcoat.

The outer layer preferably comprises a fluoropolymer. Preferred fluoropolymers for the outer layer include the TEFLON®-like fluoropolymers such as perfluoroalkoxy, tetrafluoroethylene, perfluoroalkoxy polytetrafluoroethylene (PFA), fluorine ethylene propylene monomers (FEP), polytetrafluoroethylene (PTFE), polymers thereof, and mixtures thereof. A particularly preferred fluoropolymer is perfluoroalkoxy polytetrafluoroethylene.

It is preferred that the outer fluoropolymer layer be thin enough so that it does not distort the electrical field for transfer, and thick enough so as to be a continuous layer. The thin outer layer is of a thickness of from about 1 to about 100 mils, preferably from about 1 to about 30 mils, and particularly preferred of from about 1 to about 10 mils.

In a particularly preferred embodiment of the invention, an electrically conductive filler is present in the thin outer layer. Examples of suitable fillers include carbon black such as fluorinated carbon black; metal oxides such as iron oxide, aluminum oxide, antimony tin oxide, indium tin oxide, and the like metal oxides; metals; doped metal oxides such as antimony doped tin oxide, for example, ZELEC®; and like fillers. In a preferred embodiment of the invention, the electrically conductive filler is fluorinated carbon black. Commercially available examples of fluorinated carbon black includes those sold under the tradename ACCUFLUOR®, such as ACCUFLUOR® 2028 and ACCUFLUOR® 2010 available from Allied Signal, Morristown, N.J. The optional conductive filler is present in the thin outer layer in an amount of from about 5 to about 40, preferably from about 10 to about 30, and particularly preferred from about 15 to about 20 percent by weight of total solids. Total solids, as used herein, refers to the amount of solids in the particular layer, and includes polymers, fillers, additives, and like solid material.

The conformable intermediate layer may comprise a conformable rubber. Preferred conformable intermediate layer materials include fluoropolymer and silicone rubber intermediate layers. Examples of preferred fluoropolymer materials include fluoroelastomers such as those containing copolymers or terpolymers of vinylidene fluoride, hexafluoropropylene and tetrafluoroethylene. More specifically, preferred fluoroelastomers include those, which are known commercially under various designations such as VITON A®, VITON E®, VITON E60C®, VITON E45®, VITON E430®, VITON B 910®, VITON GH®, VITON B50®, VITON E45®, and VITON GF®. The VITON® designation is a Trademark of E. I. DuPont de Nemours, Inc. Two preferred known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer. VITON A®, and VITON B®, and other VITON® designations are trademarks of E. I. DuPont de Nemours and Company.

In another preferred embodiment, the fluoroelastomer is a tetrapolymer having a relatively low quantity of vinylidenefluoride. An example is VITON GF®, available from E. I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

Other preferred haloelastomers include haloelastomers comprising polyorganosiloxane monomers and haloelastomers comprising halogen monomers and polyorganosiloxane monomers, such as polymer composites including, for example, volume grafted elastomers, titamers, grafted titamers, ceramers, and grafted ceramers.

The conformable layer is of a thickness of from about 0.01 to about 1 mm, preferably from about 0.1 to about 1 mm. The intermediate layer is preferably sufficiently conformable to prevent large air gaps that can form in transfer zones between the toner image and the surface that the toner is transferring to. "Large" air gaps typically refer to air gaps that are much larger than around 8 microns. Such air gaps are the result of many factors, including, for example, different pile heights of toner at transitions between adjacent different color image regions. The air gaps can also result from paper roughness. "Large" air gaps can lead to reduced electrostatic transfer performance due to limitations caused by, for example, air breakdown. In transfix or transfuse systems, the intermediate layer needs to be conformable so as to conform the toner image to various types of rough substrates. The conformability of the component is a function of the thickness of the material.

The hardness of the conformable intermediate layer material, is preferably from about 5 to about 60 Shore A, and more preferably from about 30 to about 50 Shore A. It is desired that the thickness of the intermediate layer and the hardness are within these ranges. In this manner, the desired conditions of reduced air gaps in electrostatic transfer zones and conformability of the toner to various rough substrates is enabled. This desired combination leads to good transfer performance and market opportunities such as printing on paper towels, cardboard boxes and other rough substrates.

The conformable intermediate layer may further comprise electrically conductive fillers, such as those listed above for use with the thin outer layer. Typical particulate fillers are carbon black, metals, metal oxides, doped metal oxides, conductive polymers and additional ionic fillers. The preferred fillers for the intermediate layer include carbon black and fluorinated carbon such as those sold under the name ACCUFLUOR®.

In electrostatic transfer applications, it is desired that the thick conformable layer have a sufficiently low volume resistivity to prevent high voltage drops across the layer in the transfer contact nip zones. It is also desirable for the conformable layer for these electrostatic transfer applications to have a volume relaxation time for charge flow in the contact nips that is less than 5 times larger than the dwell time associated with the contact residence time of the transfer member in the transfer contact nip. The volume relaxation time in the transfer nip increases with the layer volume resistivity and thickness, and with increasing capacitance of other layers of materials that may be in the transfer nip. The contact nip dwell time is proportional to the contact nip width divided by the process speed. The required volume resistivity of the intermediate layer depends on details of the electrostatic transfer application. However, typically useful intermediate layers for most systems should have a volume resistivity that is below around $10^{12}$ ohm-cm and preferably from about $10^8$ to about $10^{12}$ ohms-cm, and more preferably it should typically be below about $10^{11}$ ohm-cm, and preferably from about $10^9$ to about $10^{11}$ ohms-cm. In a particularly preferred embodiment, the volume resistivity for the conformable intermediate layer is about $10^8$ ohms-cm.

The transfer member substrate can comprise any material having suitable strength and flexibility for use as a transfer member, enabling the member to cycle around rollers during regular or prolonged use of the machine. It is preferred that the substrate be rigid. Preferred materials for the substrate include metals, plastics and fabrics.

Examples of suitable metal materials include stainless steel (various grades), aluminum, and other like metals. Preferred metals include stainless steel and grades thereof.

A fabric material, as used herein, refers to a textile structure comprised of mechanically interlocked fibers or filaments, of polymers or metals, which may be woven or nonwoven. The fibers may be polymeric, metallic, synthetic, or natural fibers woven into a strong, dimensionally-stable backing substrate. Fabrics are materials made from fibers or threads that are woven, knitted or pressed into a cloth or felt type structure. Woven, as used herein, refers to closely oriented by warp and filler strands at right angles to each other. Nonwoven, as used herein, refers to randomly integrated fibers or filaments. The fabric material should have high mechanical strength and should have desired electrical properties.

Examples of suitable fabrics include woven or nonwoven cotton fabric, graphite fabric, fiberglass, woven or nonwoven polyimide (for example KELVAR® available from DuPont), woven or nonwoven polyamide, such as nylon or polyphenylene isophthalamide (for example, NOMEX® of E. I. DuPont of Wilmington, Del.), polyester, aramids, polycarbonate, polyacryl, polystyrene, polyethylene, polypropylene, cellulose, polysulfone, polyxylene, polyacetal, and the like.

Preferably, the substrate is of a thickness of from about 25 to about 250 microns, preferably from about 25 to about 100 microns, and particularly preferred about 50 microns.

It is preferred that the substrate have high effective elastic modulus in the belt travel direction. A modulus of from about 200,000 PSI to about 1.5 million PSI is preferred. The base material should be such that minimal machine direction elastic stretch is seen during and between transfer steps, yet it should be flexible enough to achieve conformability around rollers.

Similar to the intermediate layer, for electrostatic transfer applications, the base material of the transfer member should be sufficiently conductive to prevent large voltage drops across the base in the electrostatic transfer nips. It is desired that the base layer have a volume relaxation time for charge flow in the electrostatic transfer contact nips that is less than about 5 times larger than the dwell time associated with the contact residence time of the transfer member in the transfer contact nip. Although the requirements can depend somewhat on the details of the transfer configuration, useful base layers for most systems should have a volume resistivity that is below around $10^{12}$ ohm-cm or from about $10^8$ to about $10^{12}$ ohms-cm, and more preferably it should typically be below about $10^{11}$ ohm-cm, and preferably from about $10^9$ to about $10^{11}$ ohms-cm. Resistivity is often sensitive to the applied field. The field of interest for the volume resistivity is one where the voltage drop across the thickness of the material is typically about 50 volts.

Varying the concentration of the conductive filler can provide the desired resistivity. It is important to have the resistivity within this desired range. The transfer components may exhibit undesirable effects if the resistivity is not within the required range. Other problems include resistivity that is susceptible to changes in temperature, relative humidity, and the like. The combination of layer and electrically conductive filler, in embodiments, allows for tailoring of a desired resistivity, and further, allows for a stable resistivity virtually unaffected by changes in relative humidity and temperature.

Examples of suitable transfer members include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, and the like. It is preferred that the substrate having the outer layer thereon, be an endless seamed flexible belt or seamed flexible belt, which may or may not include puzzle cut seams. Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method for manufacturing reinforced seamless belts is set forth in U.S. Pat. No. 5,409,557, the disclosure of which is hereby incorporated by reference in its entirety.

The transfer film, preferably in the form of a belt, has a width, for example, of from about 150 to about 2,000 mm, preferably from about 250 to about 1,400 mm, and particularly preferred is from about 300 to about 500 mm. The circumference of the belt is preferably from about 75 to about 2,500 mm, more preferably from about 125 to about 2,100 mm, and particularly preferred from about 155 to about 550 mm.

In a transfix embodiment, heat may be supplied to the transfix substrate via known heating methods such as radiant heat, infrared heat, internal rollers or lamps, and other known heating sources.

Specific embodiments of the invention will now be described in detail. These examples are intended to be illustrative, and the invention is not limited to the materials, conditions, or process parameters set forth in these embodiments. All parts are percentages by weight of total solids as defined above unless otherwise indicated.

EXAMPLES

Example 1
Transfer Member with Polyimide Substrate, Silicone Intermediate Layer, and Perfluoroalkoxy Tetrafluoroethylene Outer Release Layer Lab samples were prepared using a rigid base material of polyimide. The polyimide from DuPont had a resistivity of approximately $10^{16}$ ohm-cm, and was approximately 75 microns in thickness.

On top of this rigid substrate was laminated a conformable silicone material approximately 300 microns in thickness. This material was purchased in sheet form from Lauren Silicone and had a hardness of approximately 50 Shore A.

On top of the silicone was laminated an approximately 0.001 inch thick perfluoroalkoxy (PFA) material obtained from DuPont. All laminated layers had thin adhesive layers to adhere to the underlayer.

These materials were tested in a lab test fixture and were shown to perform well with regard to transfer of toner. The rigid fluoropolymer performed better than silicone and hybrid materials in the intermediate transfer function.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A transfer member comprising:
    a) a substrate,
    b) a conformable intermediate layer positioned on the substrate, wherein said intermediate layer has a hardness of from about 5 to about 60 Shore A, and
    c) a thin fluoropolymer layer positioned on said conformable intermediate layer, wherein said fluoropolymer is selected from the group consisting of fluorine ethylene propylene monomers (FEP), polytetrafluoroethylene, and perfluoroalkoxy polytetrafluoroethylene.

2. The transfer member of claim 1, wherein said thin fluoropolymer layer is of a thickness of from about 1 to about 30 mils.

3. The transfer member of claim 2, wherein said thickness is from about 1 to about 10 mils.

4. The transfer member of claim 1, wherein said fluoropolymer is perfluoroalkoxy polytetrafluoroethylene.

5. The transfer member of claim 1, wherein said thin outer layer comprises a filler selected from the group consisting of carbon black, metals, metal oxides, doped metal oxides, and mixtures thereof.

6. The transfer member of claim 5, wherein said filler is fluorinated carbon black.

7. The transfer member of claim 1, wherein said intermediate conformable layer comprises a material selected from the group consisting of fluoropolymers and silicone materials.

8. The transfer member of claim 7, wherein said intermediate conformable layer comprises a silicone material.

9. The transfer member of claim 1, wherein said intermediate conformable layer has a thickness of from about 0.01 to about 1 mm.

10. The transfer member of claim 9, wherein said thickness is from about 0.1 to about 1 mm.

11. The transfer member of claim 1, wherein said hardness is from about 30 to about 50 Shore A.

12. The transfer member of claim 1, wherein said intermediate conformable layer comprises a filler selected from the group consisting of metals, metal oxides, doped metal oxides and carbon black.

13. The transfer member of claim 1, wherein said substrate comprises a material selected from the group consisting of plastic, metal, and fabric.

14. The transfer member of claim 13, wherein said substrate comprises a fabric material selected from the group consisting of cotton fabric, graphite fabric, fiberglass, polyimide, polyamide, polyester, aramids, polycarbonate, polyacryl, polystyrene, polyethylene, polypropylene, cellulose, polysulfone, polyxylene, and polyacetal.

15. The transfer member of claim 1, wherein said substrate and conformable intermediate layers both have a volume resistivity of from about $10^8$ to about $10^{12}$ ohms-cm.

16. The transfer member of claim 15, wherein said volume resistivity is from about $10^9$ to about $10^{11}$ ohms-cm.

17. The transfer member of claim 1, wherein said conformable intermediate layer has a volume resistivity of about $10^8$ ohms-cm.

18. The transfer member of claim 1, further comprising a heating member associated with said substrate.

19. A transfer member comprising:
    a) a substrate,
    b) a conformable intermediate layer positioned on the substrate, wherein said intermediate layer has a hardness of from about 5 to about 60 Shore A,
    c) a thin fluoropolymer layer positioned on said conformable intermediate layer, wherein said fluoropolymer is selected from the group consisting of fluorine ethylene propylene monomers (FEP), polytetrafluoroethylene, and perfluoroalkoxy polytetrafluoroethylene, and
    d) a heating member associated with said substrate.

20. An image forming apparatus for forming images on a recording medium comprising:
    a) a charge-retentive surface to receive an electrostatic latent image thereon;
    b) a development component to apply a developer material to the charge-retentive surface to develop the electrostatic latent image to form a developed image on the charge-retentive surface;
    c) a first transfer member for transferring the developed image from the charge-retentive surface to a second transfer member or copy substrate, said first transfer member comprising, i) a substrate, ii) a conformable intermediate layer positioned on the substrate, wherein said intermediate layer has a hardness of from about 5 to about 60 Shore A, and iii) a thin fluoropolymer layer positioned on said conformable intermediate layer, wherein said fluoropolymer is selected from the group consisting of fluorine ethylene propylene monomers (FEP), polytetrafluoroethylene, and perfluoroalkoxy polytetrafluoroethylene.

* * * * *